Patented Dec. 26, 1922.

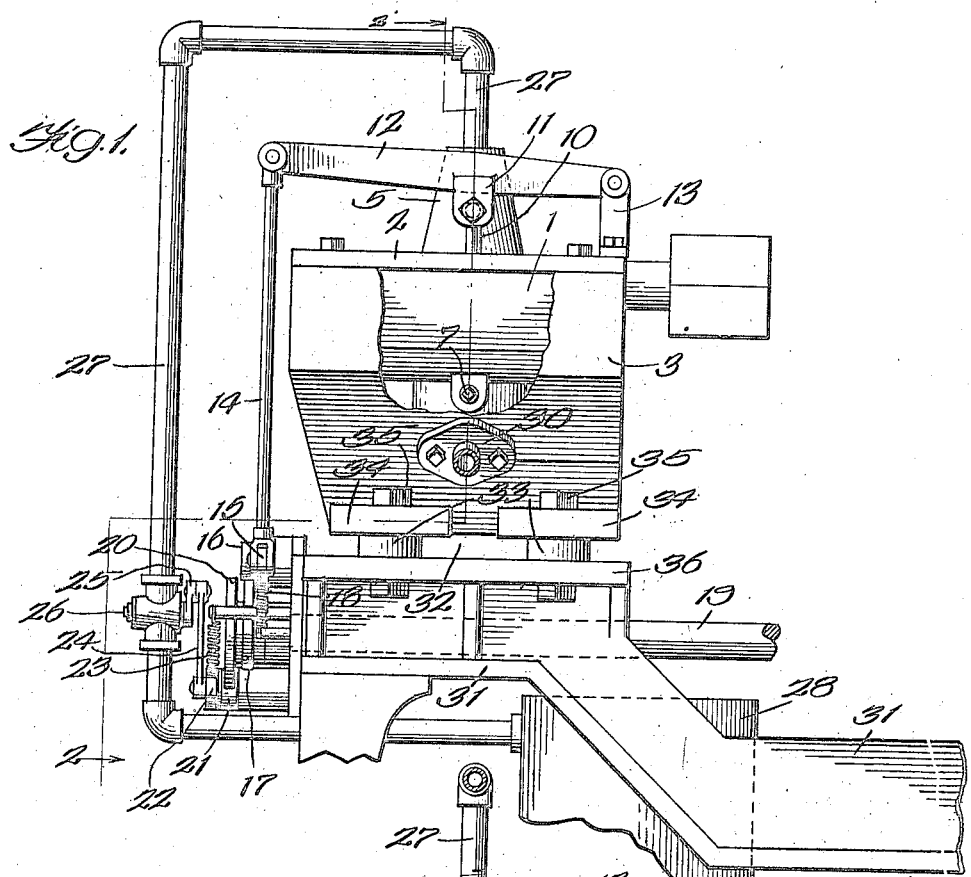

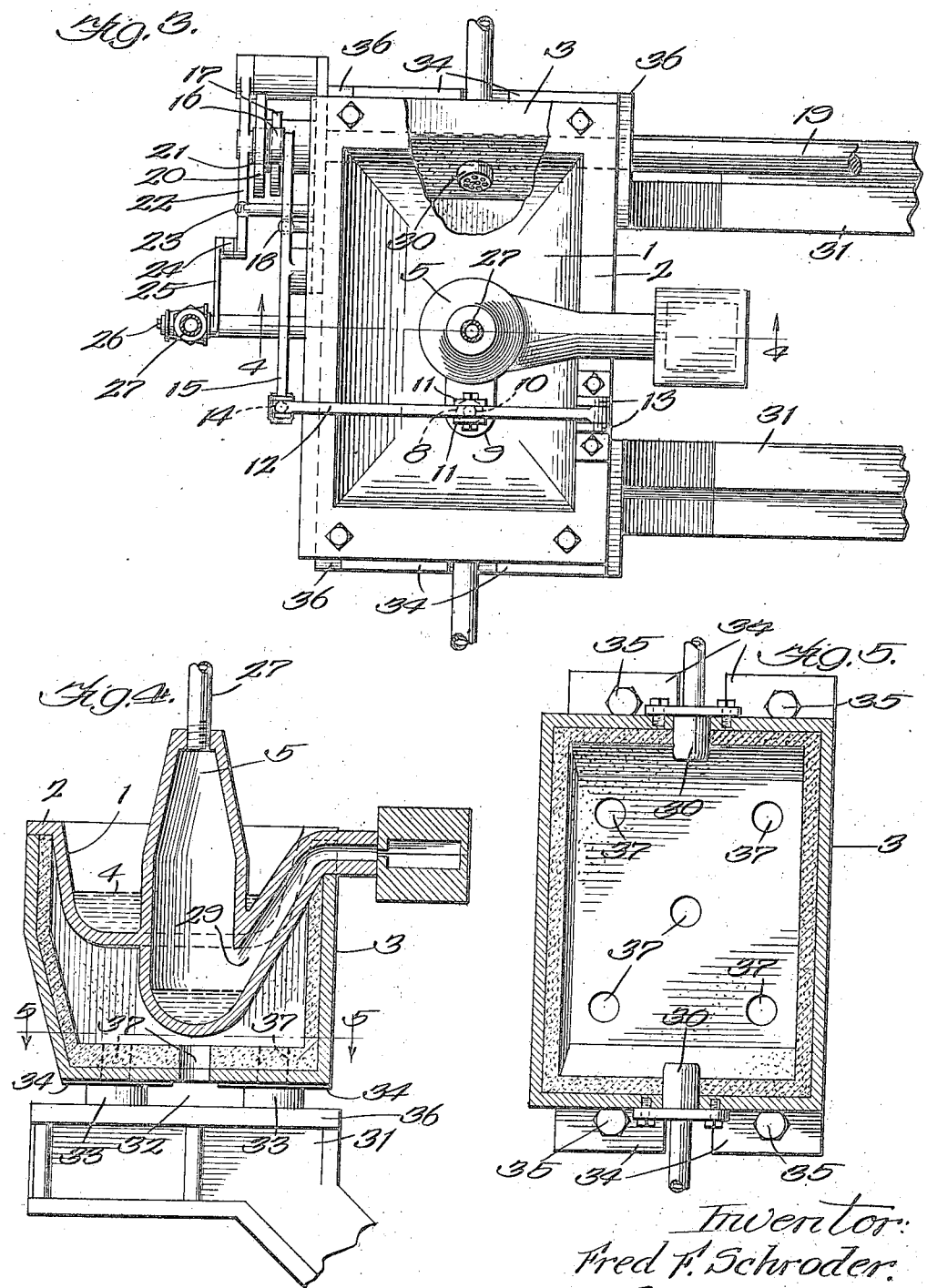

1,440,244

UNITED STATES PATENT OFFICE.

FRED. F. SCHRODER, OF CHICAGO, ILLINOIS, ASSIGNOR TO HENRY G. SAAL, OF CHICAGO, ILLINOIS.

MELTING APPARATUS.

Application filed June 30, 1919. Serial No. 307,564.

*To all whom it may concern:*

Be it known that I, FRED. F. SCHRODER, citizen of the United States, residing at Chicago, in the county of Cook and State of Illinois, have invented a certain new and useful Improvement in Melting Apparatus, of which the following is a full, clear, concise, and exact description.

My invention relates to melting pots and receivers for holding molten material received from the melting pots.

In accordance with one feature of my invention the melting pot is tapered toward its bottom instead of having the bottom in angular relation to the sides of the melting pot whereby the material being melted is not free to linger in any part of the melting pot when the melted material is withdrawn therefrom. The melting pot of my invention therefore enables me to maintain all of the material in the melting pot at substantially uniform temperature and homogeneous throughout which is of much importance as an alloy is a mechanical mixture of metals. In melting pots of the prior art it frequently happens that heavier metals of a mixture of metals will be more or less precipitated from the mixture of which they should fully remain a part, a result which is impossible with the melting pot of my invention.

The invention, in accordance with another feature, resides in the combination of a melting pot with a receiver into which the melted material may pass from the melting pot, this receiver being in one integral structure with the melting pot and having a bottom portion which is a continuation of the bottom portion of the melting pot and which projects below the melting pot so as to be subject to the same source of heat which heats the melting pot. With such a structure the material in the melting pot need not be raised to as high a temperature as hitherto, the material in the bottom of the receiver being heated to a higher degree than that in the pot and to such a degree as is required in a casting operation. Not only do I acquire a very high heat for melting the material in the melting pot but a further advantage is secured in that the material received from the melting pot instead of having its temperature reduced with respect to the material in the melting pot has its temperature increased so that there is no liability of the material congealing while in the receptacle.

In accordance with another feature of the invention the upper portion of the receiver is upwardly tapered or downwardly flared to spread air or other inert gas that is used to effect the discharge of the material from the receiver evenly over the top surfaces of such material to render the pressure of the ejecting air uniform thereby eliminating undesirable currents of air or air and melted material in the receiver so that the material may be discharged from the receiver in a condition which is homogeneous throughout.

In accordance with another feature of the invention the discharge nozzle of the receiver has its passage outwardly tapered so that the material in its discharge from the receiver tends to be compacted rather than to be rarified whereby it is more certainly retained homogeneous in its passage from the receiver to the molding machine.

Hitherto it was the practice to continue the walls of the fire box downwardly to meet the bed which also supported the associated molding or casting machine. These continuations of the fire box would become heated to varying degrees, rendering it difficult to secure proper registry between the discharge end of the nozzle and the receiving or sprue end of the dies.

In accordance with another feature of my invention I eliminate these downward continuations of the walls of the fire box and continue the bed of the machine upwardly to be very near the bottom of the fire box and preferably interpose short distance pieces between the bed of the machine and the bottom of the fire box to prevent heat from radiating to the bed of the machine. Radiation of heat from the fire box to the bed is guarded against not only by the cooling effect of the air circulating among the distance pieces in the space between the bottom of the fire box and the bed but also by maintaining the bottom of the fire box comparatively cool by air which is passed through the bottom of the fire box to the fire box interior, which air may also be used in maintaining combustion within the fire box.

I will explain my invention more fully by reference to the accompanying drawings showing the preferred embodiment thereof and in which Fig. 1 is a view in elevation, partly broken away, of a part of the structure which includes the apparatus of my invention; Fig. 2 is a sectional view on line 2—2 of Fig. 1; Fig. 3 is a plan view of the structure, partly broken away, which is shown in Fig. 1; Fig. 4 is a sectional view on line 4—4 of Fig. 3; and Fig. 5 is a sectional view on line 5—5 of Fig. 4.

The melting apparatus is inclusive of a melting pot 1 which is provided with a flange 2 also to constitute a lid for the fire box 3 that furnishes the heat to melt the metal or metal mixture placed within the pot as indicated at 4. This box may be lined with fire brick. By governed means admission of molten material may occur from the melting pot 1 to the receiving chamber 5 which is preferably integrally formed with or is otherwise constituted a part of the pot and lid structure 1—2. This receiver has its bottom portion preferably extending below the bottom of the pot to be within the fire box to be subject to the heat thereof so that the metal passing from the pot to the receiver will not be cooled but, in fact, will be hotter than the metal in the pot, the metal being raised to the final degree of its heat within the receiver to put it in just the molten condition required for proper casting. The inverted T-shaped passage 6 establishes communication between the melting pot and the receiver. The inner end of the horizontal branch or head of the T-shaped passage 6 communicates with the interior of the receiver and the outer end of this horizontal branch is closed by a screw plug 7 which may be removed to clean the passage.

Hitherto the plug 7 was omitted and when the passage would be plugged up by metal freezing therein the pot structure would have to be discarded.

The upright branch or stem of the T-shaped passage 6 is normally closed by a reciprocable valve 8 guided in its movement by the guide 9 projecting laterally from the receiver. The stem 10 of the valve pivotally depends from the ears 11 at the lower side of the lever 12. This lever is fulcrumed, at one end, upon the upright 13 carried by the rim of the pot 1 and is connected at its other end to the actuating rod 14 that depends from the lever. This rod is connected at its lower end with one end of the intermediately pivoted rocker arm 15 whose other end carries a cam roller 16 held in engagement with a cam 17 by the spring 18 which presses the rocker arm and the cam roller thereon toward said cam. A shaft 19 carries the cam 17, the rotation of this shaft having suitable relation to other operations of the casting machine. When the cam roller engages the outer segment of the cam the valve 9 will be closed through the intermediation of the described parts between the cam roller 16 and the valve 8. When the cam roller is upon the inner segment of the cam the valve 8 will be opened, the relatively duration of the open and closed condition of the valves being determined by the peripheral lengths of the outer and inner segments of said cam. The shaft 19 also carries a cam 20 which is engaged by a cam roller 21. This cam roller is mounted upon an intermediate portion of the arm 22 to which a spring 23 is attached to press the arm upwardly and thereby maintain the engagement of the cam roller 21 with the cam 20. A link 24 connects the outer end of the arm 22 with the arm 25 fixed upon the stem of the valve 26. This valve is located in a pipe 27 to prevent or permit the passage of compressed air therethrough, said pipe being in communication at one end with a suitable source of air under pressure diagrammatically indicated at 28 and at its other end with the top portion of the receiver 5. The two cams 16 and 21 are so related that the valve 26 will be closed when the valve 8 is opened and vice versa. When the valve 26 is opened it serves to effect the forcible ejection of a portion of the molten metal within the receiver through the discharge nozzle passage 29.

The body of molten metal that is illustrated within the receiver 5 is shown small in quantity in order that the nozzle passage 29 might more clearly appear. Normally the molten metal within the receiver has the same upper level as the metal within the melting pot 1.

Compressed air is admitted through the pipe 27 for the purpose of effecting the ejection of sufficient metal from the receiver through the nozzle passage 29 to the molds which are to define the shape of the casting. The upper portion of the receiver is downwardly conically flared to permit the air to expand after it has left the pipe so that it will strike the metal uniformly upon the top surface thereof rather than in a more direct and limited stream which would be the case if the receiver were not tapered as illustrated. The air thus exerts uniform pressure upon the top of the body of molten metal within the receiver to effect the uniform expulsion of the metal through the nozzle passage. The nozzle passage, in turn, is tapered from its receiving end toward its outlet end whereby the molten metal is more compressed or compacted at the discharge end of the nozzle, the result being that the metal as it enters the molding machine is prevented from being of a spongy nature.

Any suitable means may be employed for heating the metal in the melting pot, the means illustrated being in the nature of fuel jets 30 adapted to burn oil or gas in the presence of the melting pot and the bottom portion of the receiver that projects below the lever of the melting pot into the fire box 3.

The nozzle of the receiver has abutting engagement with the mold or die structure which is of a form to suit the casting that is to be made.

The bottom of the melting pot and the sides thereof are together curvilinear in cross section or otherwise formed so as to taper downward to prevent any metal included in a mechanical mixture of metals from partially separating out from the mixture and also enabling the more even application of the melting heat to material in the melting pot.

The bed 31 that supports the melting apparatus and which is also preferably an integral continuation of the bed that supports the casting machine, is upwardly continued to lie close to the bottom of the fire box yet to be spaced apart therefrom by a circulating air space 32. Short distance pieces 33 are interposed between the bed of the apparatus and horizontal ears 34 extending laterally from the bottom of the fire box. These distance pieces may be in the nature of washers through which assembly bolts 35 are passed, these bolts passing through the aforesaid ears 34 and ears 36 projecting laterally from the supporting bed. The radiation of heat from the bottom of the fire box of the supporting bed is thus reduced to a very low point and is further obstructed by means of the cooling air passing through the air space 32 into the openings 37 at the bottom of the fire box. The air thus passing to and through the bottom of the fire box into the interior of this box may also be used to maintain combustion within the fire box.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

The combination with a melting pot, of a receiver, there being a passage in the form of a T for affording communication between the receiver and the melting pot to enable the receiver to receive melted material from the melting pot; a valve for opening and closing the stem portion of the T-shaped passage; and a plug at the outer end of the head portion of the T-shaped passage.

In witness whereof, I hereunto subscribe my name this ninth day of May A. D., 1919.

FRED. F. SCHRODER.